(12) United States Patent
Keesen et al.

(10) Patent No.: US 7,006,756 B1
(45) Date of Patent: Feb. 28, 2006

(54) METHOD AND APPARATUS FOR TIMESTAMPING A BITSTREAM TO BE RECORDED

(75) Inventors: Heinz-Werner Keesen, Hannover (DE); Ralf Ostermann, Hannover (DE)

(73) Assignee: Deutsche Thomson-Brandt GmbH, Villingen-Schwenningen (DE)

(*) Notice: Subject to any disclaimer, the term of this patent is extended or adjusted under 35 U.S.C. 154(b) by 0 days.

(21) Appl. No.: 09/786,439

(22) PCT Filed: Aug. 26, 1999

(86) PCT No.: PCT/EP99/06246

§ 371 (c)(1),
(2), (4) Date: Mar. 5, 2001

(87) PCT Pub. No.: WO00/14952

PCT Pub. Date: Mar. 16, 2000

(30) Foreign Application Priority Data

Sep. 7, 1998 (EP) .................................. 98250316
Mar. 2, 1999 (EP) .................................. 99250056

(51) Int. Cl.
*H04N 5/95* (2006.01)
(52) U.S. Cl. .............................. 386/85; 386/65; 386/111
(58) Field of Classification Search .................. 386/13, 386/46, 85, 88, 100, 65, 66, 111, 112; 348/423.1, 348/497; 725/82, 85, 131, 141, 153; 370/509–516; 375/371
See application file for complete search history.

(56) References Cited

U.S. PATENT DOCUMENTS 5,579,183 A  11/1996  Van Gestel et al.

(Continued)

FOREIGN PATENT DOCUMENTS

EP       710 021 A2      5/1996

(Continued)

OTHER PUBLICATIONS

Rudolf H.J. Bloks, *The IEEE-1394 High Speed Serial Bus*, Philips Journal of Research, vol. 50, No. 1/2, 1996, pp. 209-216.

(Continued)

*Primary Examiner*—James J. Groody
*Assistant Examiner*—Christopher Onuaku
(74) *Attorney, Agent, or Firm*—Joseph S. Tripoli; Ronald H. Kurdyla; Joel M. Fogelson

(57) ABSTRACT

A set top box can be connected to a DVD Streamer via an IEEE1394 interface which contains means to timestamp data and to strip off these timestamps again, using them for timing regeneration. The DVD stream also must regenerate the timing of data packets as it was upon recording, when these packets are played back. The streamer could also use its own timestamps and strip them off again when replaying. So, in total, there is an in-series connection between two time stamping and time regeneration mechanism which introduces jitter accumulation.

14 Claims, 2 Drawing Sheets

U.S. PATENT DOCUMENTS

| | | | |
|---|---|---|---|
| 5,689,507 A | | 11/1997 | Bloks et al. |
| 5,805,602 A | * | 9/1998 | Cloutier et al. ............. 348/497 |
| 5,983,301 A | * | 11/1999 | Baker et al. ................ 710/113 |
| 6,032,261 A | * | 2/2000 | Hulyalkar ................... 713/400 |
| 6,236,694 B1 | * | 5/2001 | Blatter et al. ............ 348/423.1 |

FOREIGN PATENT DOCUMENTS

| | | |
|---|---|---|
| EP | 774 753 A2 | 5/1997 |
| EP | 749 244 A2 | 12/1999 |
| WO | 97/00579 | 1/1997 |

OTHER PUBLICATIONS

David Banks et al., *Breaking open the set top box,* Hewlett-Packard Laboratories, Bristol, United Kingdom, SPIE vol.: 3228, XP-002064906 Nov. 4, 1997, pp. 105-116.

R.W.J.J. Saeijs et al, *An Experimental Digital Consumer Recorder for MPEG-Coded Video Signals,* Philips Research Labs, Netherlands, 8037 IEEE Transactions on Consumer Electronics 41 (Aug. 1995), No. 3, New York, US, pp. 651-660.

* cited by examiner

METHOD AND APPARATUS FOR TIMESTAMPING A BITSTREAM TO BE RECORDED

This application claims the benefit under 35 U.S.C. § 365 of International Application PCT/EP99/06246, filed Aug. 26, 1999, which was published in accordance with PCT Article 21(2) on Mar. 16, 2000 in English, and which claims the benefit of EPO Application No. 98250316.1, filed Sep. 7, 1998 and EPO Application 99250056.1, filed Mar. 2, 1999.

FIELD OF THE INVENTION

The invention relates to a method and to an apparatus for timestamping a bitstream to be recorded or for using timestamps when replaying from a stream recorder, e.g. an optical disc recorder.

BACKGROUND

Stream recording assumes an 'application device', e.g. a settop box, connected to a DVD Streamer. Both devices are connected via e.g. an IEEE1394 (IEC 611883) interface which in its transmitting and receiving firmware contains means to timestamp data and to strip off these timestamps again, using them for timing regeneration. The resulting effect is that this system behaves between the IEEE1394 interface input and the IEEE1394 interface output like a constant delay system. EP-A-0 701 374 describes the recording of superpackets each including a timestamp.

SUMMARY OF THE INVENTION

A stream recorder must re-generate the timing of data packets as it was upon recording, when these packets are played back, so that between recording and playback this system also behaves like a constant delay system. In one embodiment of the invention the stream recorder adds its own timestamps to the data packets when recording and evaluates them when replaying in order to assign to the data packets the correct temporal position. Thereby the original data packet burst characteristic is reconstructed for a data stream having in principle non-equidistant data packets.

However, there is an in-series connection between two timestamping and time regeneration mechanisms which can introduce jitter accumulation. In a second embodiment of the invention the application device itself, before sending the data through the IEEE1394 interface, adds time stamps to the data packets. These timestamps may have the meaning of 'departure time' rather than 'arrival time' and pass the IEEE1394 interface 'unnoticed', i.e. from a IEEE1394 interface point of view they are part of the payload. At the other end of the chain these timestamps are used when the stream recorder plays back a stream. The advantage is that there is only one timing/regeneration process involved which has influence on the temporal position of the replayed data packets, and that therefore no jitter is accumulated. In this second embodiment the stream recorder does not make use of the IEEE1394 timestamps.

In a third embodiment the stream recorder records the IEEE1394 timestamps and evaluates them when replaying in order to assign to the data packets the correct temporal position.

It is one object of the invention to disclose a method for recording and replaying a bitstream, wherein after replaying the recorded data packets do have the correct temporal location within the bitstream and wherein no jitter accumulation takes place. This object is achieved by the methods disclosed in claims 1, 3 and 4.

It is a further object of the invention to disclose an apparatus which utilises the inventive method. This object is achieved by the apparatuses disclosed in claims 6, 7, 9 and 10.

In principle, the inventive method is suited for: timestamping a bitstream to be recorded or for using timestamps when replaying from a stream recorder, wherein a device or signal source outputting said bitstream to be recorded adds said timestamps to data packets of said bitstream and wherein the data packets of said bitstream pass to said stream recorder through a network which causes network jitter and for which network said timestamps belong to the payload of said data packets, and wherein said timestamps are used when replaying said data packets from said stream recorder in order to relocate the replayed data packets to the corresponding original temporal position in said bitstream, or is suited for: timestamping an MPEG bitstream to be recorded or for using timestamps when replaying from a stream recorder, wherein MPEG timestamps are included in data packets of said MPEG bitstream to be recorded and for the recording additional timestamps generated by said stream recorder become attached to the data packets of said MPEG bitstream to be recorded, and wherein said additional timestamps are used when replaying said data packets from said stream recorder in order to relocate the replayed data packets to the corresponding original temporal position in said MPEG bitstream, or is suited for: timestamping a bitstream to be recorded or for using timestamps when replaying from a stream recorder, wherein data packets of said bitstream pass to said stream recorder through a network which causes network jitter and which network internally adds network timestamps to data packets of said bitstream in order to reduce said jitter when outputting said data packets, and wherein said stream recorder records said network timestamps and during replay uses said recorded network timestamps in order to relocate the replayed data packets to the corresponding original temporal position in said bitstream. Advantageous additional embodiments of the inventive method are disclosed in the respective dependent claims.

In principle, the inventive apparatus is suited for timestamping a bitstream to be recorded and includes:
  program selection means which provide data packets from said bitstream, the data packets belonging to a specific program;
  a network interface which provides data of said data packets to a stream recorder or which receives data of said data packets from said stream recorder, wherein the related network causes network jitter and for which network said timestamps belong to the payload of said data packets and wherein said timestamps are used to relocate the replayed data packets to the corresponding original temporal position in said bitstream;
  means for generating timestamps and for adding these timestamps to the data of said data packets, which means provide the output data to said network interface;
  means for decoding replayed data of said data packets received from said network interface, and concerns a Stream recorder for a bitstream, including:
  a network interface which provides data of data packets of said bitstream including timestamps, having been inserted outside said network interface, for recording or which receives replayed recorded data, wherein the related network causes network jitter and for which network said timestamps belong to the payload of said data packets;

stream recording means which record data of said data packets including said timestamps or which replay data of said data packets, wherein during replay said timestamps are used in order to relocate the replayed data packets to the corresponding original temporal position in said bitstream before the replayed data packets enter said network interface, or concerns a Stream recorder for a bitstream, including:

a network interface which provides data of data packets of said bitstream, said data packets including MPEG timestamps, for recording or which receives replayed recorded data for data packets including said MPEG timestamps;

stream recording means which record data of said data packets, including said MPEG timestamps, and additional timestamps generated by said stream recording means which become attached to the data packets of said MPEG bitstream to be recorded, or which replay data of said data packets, wherein during said replay said additional timestamps are used in order to relocate the replayed data packets to the corresponding original temporal position in said MPEG bitstream, or concerns a Stream recorder for a bitstream, including:

a network interface which provides data of data packets of said bitstream for recording or which receives replayed recorded data, wherein the related network causes network jitter and which network internally adds network timestamps to data packets of said bitstream in order to reduce said jitter when outputting said data packets;

stream recording means which record data of said data packets including said network timestamps, or which replay data of said data packets, wherein during replay said network recorded timestamps are used in order to relocate the replayed data packets to the corresponding original temporal position in said bitstream before the replayed data packets enter said network interface.

Advantageous additional embodiments of the inventive apparatuses are disclosed in the respective dependent claims.

BRIEF DESCRIPTION OF THE DRAWINGS

Embodiments of the invention are described with reference to the accompanying drawings, which show in.

DETAILED DESCRIPTION

The following abbreviations are used in the description: DVD: digital versatile disc, LB: logical block, RBN: relative byte number, RBP: relative byte position, RLBN: relative logical block number, STB: set top box, TOC: table of content, SCR: system clock reference, SOB: stream object, DVD RTRW: DVD realtime rewritable, PES: packetised elementary stream, PTS: presentation timestamp, DTS: decoding timestamp, ATS: application timestamp.

Figure 1:
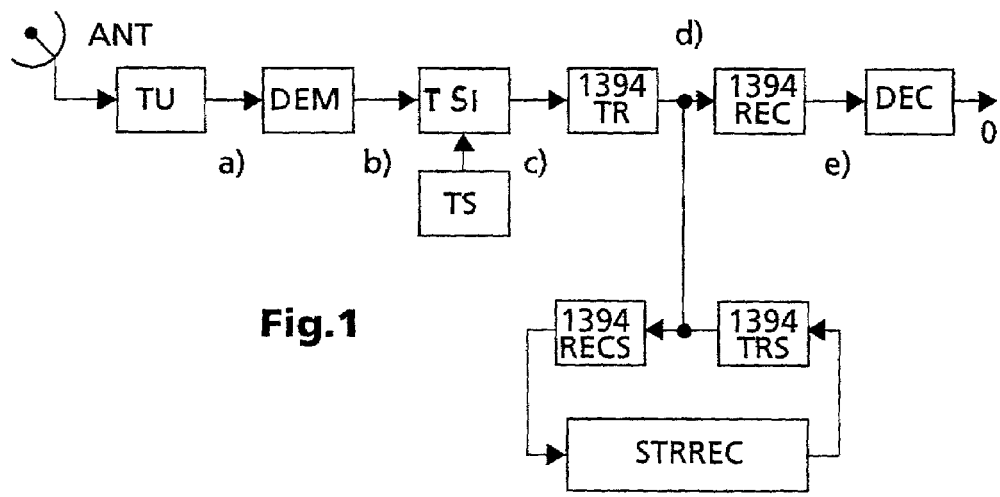
FIG. 1 simplified block diagram of a settop box and a Stream recorder with IEEE1394 connection.

In FIG. 1 transport streams are received by an antenna ANT and pass through a tuner TU selecting one of the transport streams, and through a demultiplexer DEM. Into the output signal of DEM time stamps can be inserted in a time stamp inserter TSI which receives the time stamps from a time stamp generator TS.

An application device which can be a DVD stream recorder including stream recording means STRREC, receives output data from DEM or TSI, respectively, via an IEEE1394 interface transmitter 1394TR and an IEEE1394 interface receiver 1394RECS. The data replayed from STRREC pass through an IEEE1394 interface transmitter 1394TRS and an IEEE1394 interface receiver 1394REC to decoder means DEC which deliver the final output signal or signals O. DEC may include a video decoder, one or more audio decoders and one or more additional data decoders.

Instead of an IEEE1394 connection any other network causing network jitter like the Ethernet or the Internet can be used.

TU, DEM, TS, TSI, 1394TR, 1394REC and DEC can be parts of a settop box. 1394RECS, STRREC and 1394TRS can be parts of a DVD stream recorder. Instead of a settop box any other data stream source can be used, e.g. a DVD player or a PC or Internet receiver. In that case ANT and TU is replaced by e.g. an optical disc and a pickup.

Figure 2:
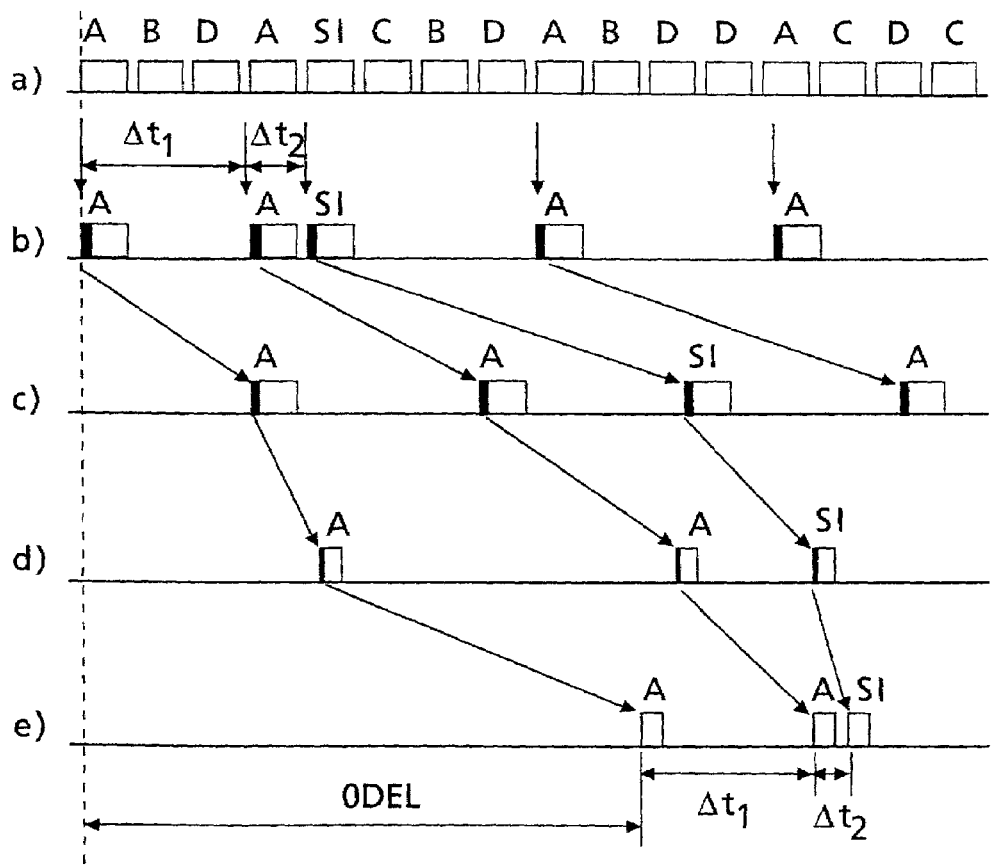
FIG. 2 steps in the transmission of a transport stream.

FIG. 2 depicts the temporal behaviour of certain items of the received PES stream with respect to the functional blocks in FIG. 1. FIG. 2a shows a transport stream with multiplex of packets of programs A, B, C and D, and SI information at the output of TU in FIG. 1. FIG. 2b depicts source packets of the selected program A with its relevant SI information at the output of DEM in FIG. 1. The black parts of the packets are the packet headers which include transmitted time stamps represented by the arrows. FIG. 2c shows source packets at the output of the smoothing buffer inside IEEE1394 transmitter 1394TR which causes such a delay that the packets are now essentially equidistant. FIG. 2d shows the source packets at the input of the IEEE1394 receiver 1394REC which introduces an additional delay, wherein it is assumed that no stream recorder is connected or that the stream recorder has no influence on the temporal location of the packets. FIG. 2e depicts the reconstructed timing for the source packets at the output of 1394REC which again introduces an additional delay. One can see that time differences $\Delta t_1$ and $\Delta t_2$ of FIG. 2e finally correspond to that of FIG. 2b. The arrival time is the departure time plus the overall delay ODEL which is represented by a timestamp offset.

The clock frequency for transferring the bytes of a transport stream may be different in different applications. An IEEE1394 system uses segments having a length of 125 $\mu$s, called cycle master packet. Within such cycle a data packet has a non-defined temporal position, i.e. a jitter range of maximum nearly 125 $\mu$s is introduced. Therefore the IEEE1394 system makes use of its own 'timestamps' which serve to temporally correctly relocate the packets within the 125 $\mu$s segments at the output of an IEEE1394 receiver. The exact timing is important for a succeeding decoder because the decoder's buffer capacity is limited and an additional jitter in the data packets could cause buffer overflow or underflow and thereby erroneously decoded data. An IEEE1394 transmitter includes a buffer at its input and an IEEE1394 receiver includes a buffer at its output, which smooth the average data rate. Additionally, in the IEEE1394 system a temporal compression of the data packets takes place which is apparent from the comparison of FIGS. 2c and 2d. This compression also increases the maximum jitter at the demultiplexer output. In addition to the limited temporal resolution in the IEEE1394 system described above a further portion of jitter is added by the non-perfect 25 MHz clock.

A proposed stream recorder specification offers the possibility to record stream-recorder generated timestamps which are derived from e.g. a 27 MHz clock. In one embodiment of the invention the stream recorder records the IEEE1394 timestamps instead and evaluates them when replaying in order to assign to the data packets the correct temporal position.

The length of the data packets is programmable in the IEEE1394 system. Therefore in another embodiment of the invention the original 188 byte length of the transport stream packets is increased by e.g. 4 bytes to a total length of 192 bytes in order to add timestamps supplied from the application device, e.g. a settop box.

The DVD Stream Recording system is designed to use rewritable DVD discs for recording existing digital bitstreams, editing them and playing them back as bitstreams. This system is designed to satisfy the following requirements:

- Any packet size is supported as long as it is equal or less than 2 kByte and is of constant length within a take.
- timing mechanism, i.e. a time stamp is added to every broadcast packet to enable proper packet delivery during playback.
- To enlarge the fields of applications, non-real-time recording should be possible. However, in this case the STB has to generate the timestamp information.
- Data allocation strategy and a file system to support real-time stream recording.
- Many digital services require Service Information which normally is embedded in the real-time stream. To support a STB fed by data from a DVD player, the DVD should provide additional space, which can be used by the STB to duplicate part of the service information and to add additional TOC information.
- Copy Protection must be supported. In addition, any scrambling performed by the service provider or the STB must be kept unchanged.

User requirements can be grouped into requirements for recording, requirements for playback, and requirements for editing:

Real-Time Recording

The system is designed to enable real-time recording of digital streams. It allows the user to concatenate recordings, even if those recordings consist of different stream formats. If recordings are concatenated, a seamless or close-to-seamless playback feature can be achieved, but is not required.

Navigation Support

To support navigation two pieces of information (lists) are generated during recording:

1) An 'original' version of a play list. This list contains quite low level information, e.g. time map or (broadcast) packet order of the recording. This list is accessible by the STB and the content is understood by the DVD streamer as well as by the STB. In its original version the playlist enables the playback of a complete recording. The playlist may be accessed and extended after recording by the STB to allow more sophisticated playback sequences.

2) The second piece of information, a mapping list, is generated to support the stream recorder to retrieve packet stream chunks (cells), that are described in terms of the application domain, e.g. 'broadcast packets' or 'time'. This list is owned and understood by the DVD streamer only.

Content Description

The system can reserve space which can be used by the STB to store high-level TOC and Service Information. This information is provided for the user to navigate through the content stored on disc and may contain sophisticated EPG information. The content needs not to be understood by the stream recorder. However a common subset of the TOC information, e.g. based on a character string, may be useful to be shared between STB and DVD, in order to enable the stream recorder to provide a basic menu by itself.

Playback of individual recording and playing all recordings sequentially is possible via a play list.

Player Menus for Entry Point Selection

The STB can generate a sophisticated menu based on the TOC information stored on the disc. A simple menu is generated by the streamer itself, e.g. via some 'character' information which is shared by STB and DVD.

Trick Play Modes

The STB can steer trick play via the 'play list'. Due to the nature of the broadcast stream, the trick play features may be limited to basic ones, e.g. Time Search and Title Jump. User defined playback sequence features like programming or parental control can be supported via the play list.

The DVD streamer creates the 'original version' of the play list. It can allow extensions and modifications of the play list by the STB for more sophisticated playback features. The DVD streamer is not responsible for the content of those sophisticated playlist(s). The system supports the deletion of single recordings on user's request. Preferably the system allows this feature under the control of the STB. The system may support insert editing.

Concerning the directory and file structure, the organisation of Stream Data and Navigation Data of DVD Stream Recording is done in a specific way such as to take into account the following:

- Any DVD Streamer device has certain requirements to store its own housekeeping data or Streamer-specific navigation data on the disc. These data are solely for helping the retrieval of recorded data; they need not be understood or even be visible to any outside application device AD.
- Any DVD Streamer device needs to communicate with the application device AD it is connected to. This communication is as universal as possible so that the maximum possible range of applications can be connected to the Streamer. The Navigation Data to support such communication are called Common navigation data and must be understandable by the Streamer as well as by the application device.
- The Streamer device offers to the connected application device AD a means for storing its own private data of any desired kind. The Streamer needs not to understand any of the content, internal structure, or meaning of this application-specific navigation data.

A possible directory and file structure is described below. The files storing the disc content are placed under the STRREC directory which is under the root directory. Under the STRREC directory the following files are created:

COMMON.IFO

Basic information to describe the stream content. Needs to be understood by the Application Device as well as the Streamer.

STREAMER.IFO
Private housekeeping information specific to the Streamer Device. Needs not to be understood by the Application Device.
APPLICAT.IFO
Application Private Data, i.e. information that is specific to the Application(s) connected to the Streamer. Needs not to be understood by the Streamer.
REALTIME.SOB
Recorded real-time stream data proper. Note that except for the files described above, the STRREC directory shall not contain any other files or directories.

Stream Data include one or more 'Stream Objects' (SOBs) which each can be stored as a 'Program stream' as described in ISO/IEC 13818-1, Systems. A SOB can be terminated by a program_end_code. The value of the SCR field in the first pack of each SOB may be non-zero. A SOB contains the Stream Data packed into a sequence of 'Stream Packs' (S_PCKs). Stream data can be organised as one elementary stream and are carried in PES packets with a stream_id. In Stream recording, the application performs its own padding so that the pack length adjustment methods of DVD-ROM Video or RTRW need not to be used. In Stream recording it is safe to assume, that the Stream packets will always have the necessary length.

Figure 3:
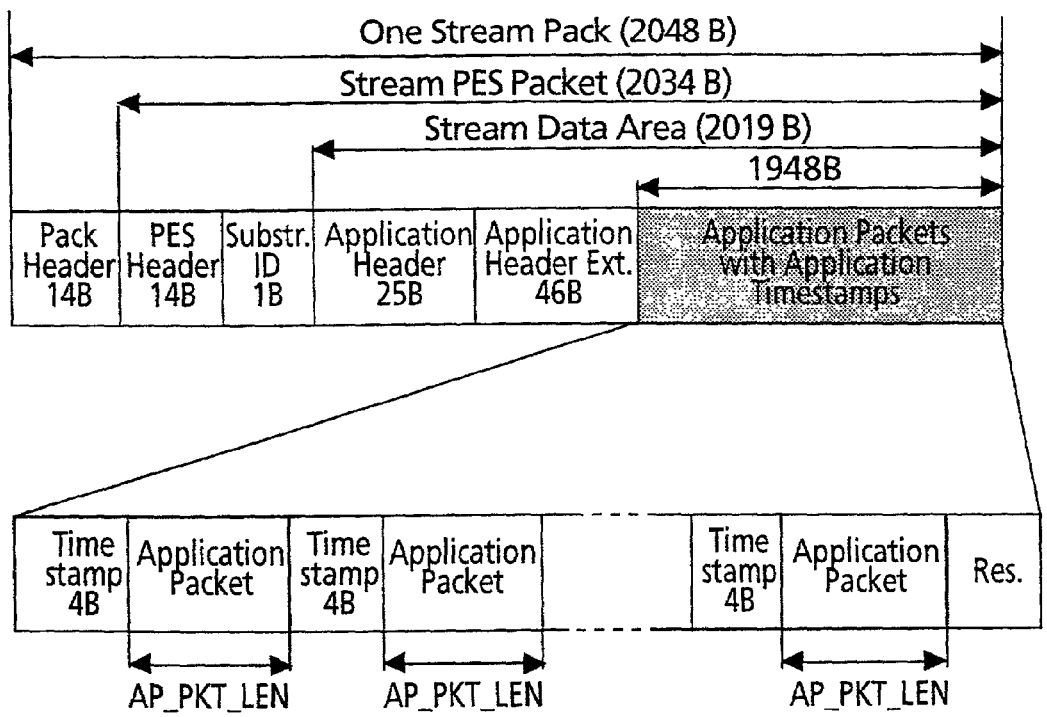
FIG. 3 structure of a stream pack.

As shown in FIG. 3, a Stream Pack has 2048 bytes and includes a pack header followed by a Stream PES Packet. A system header may be included in those S_PCKs which are the first S_PCK of a SOB. When a system header is included the length of the remaining Stream PES Packet content may be 2010 bytes, and when not included, 2034 bytes. A pack is recorded in one LB. The pack header may include the following items of data:

| Field | Number of bits | Number of bytes | Value | Comment |
|---|---|---|---|---|
| Pack_start_code | 32 | 4 | 0000 01BAh | |
| '01' | 2 | 6 | provider defined | 01b |
| SCR_base[32 . . . 30] | 3 | | | (Note 1) |
| marker_bit | 1 | | | 1 |
| SCR_base[29 . . . 15] | 15 | | | |
| marker_bit | 1 | | | 1 |
| SCR_base[14 . . . 0] | 15 | | | |
| marker_bit | 1 | | | 1 |
| SCR_extension | 9 | | | |
| marker_bit | 1 | | | 1 |
| program_mux_rate | 22 | 3 | 01 3883h | mux_rate = 8 Mbps (Note 2) |
| marker_bit | 1 | | | 1 |
| marker_bit | 1 | | | 1 |
| reserved | 5 | | | 11111b |
| pack_stuffing_length | 3 | 1 | F8h | no stuffing length = 000b |

Note 1: 'SCR_base[32]' is set to ZERO.
Note 2: 'program_mux_rate' is set to 8 Mbps.

In a Stream PES Packet, the stream PES packet header content is identical to that defined in the DVD standard, with the following limitations and additional rules:

The 'stream_id' field is set to 0xBD (private_stream_1)
The total length of the stream PES packet header is 14 bytes. Therefore the 'PES_header_data_length' field is set to 5 bytes.
Each stream PES packet header carries a PTS timestamp. DTS timestamps are not encoded. Therefore the 'PTS_DTS_flags' is set to '10b'.
The 'PES_packet_length' includes any reserved bytes behind the last Application transport packet up to the end of the streamer DVD pack. Therefore the 'PES_packet_length' is always 2028 bytes.
No padding PES packet shall be encoded in a streamer DVD pack. Padding is be described below in the 'application header'.
The Stream PES packet header may include the following items of data:

| Field | Number of bits | Number of bytes | Value | Comment |
|---|---|---|---|---|
| Packet_start_code_prefix | 24 | 3 | 00 0001h | |
| Stream_id | 8 | 1 | 1011 1101b | private_stream_1 |
| PES_packet_length | 16 | 2 | 07 ECh | 2028 |

-continued

| Field | Number of bits | Number of bytes | Value | Comment |
|---|---|---|---|---|
| '10' | 2 | 3 | 10b | |
| PES_scrambling_control | 2 | | | |
| PES_priority | 1 | | 0 | no priority |
| data_alignment_indicator | 1 | | 0 | not defined by descriptor |
| copyright | 1 | | 0 | not defined by descriptor |
| original_or_copy | 1 | | 0 | copy |
| PTS_DTS_flags | 2 | | 10b | |
| ESCR_flag | 1 | | 0 | no ESCR field |
| ES_rate_flag | 1 | | 0 | no ES rate field |
| DSM_trick_mode_flag | 1 | | 0 | no trick mode field |
| additional_copy_info_flag | 1 | | 0 | no copy info field |
| PES_CRC_flag | 1 | | 0 | no CRC field |
| PES_extension_flag | 1 | | 0 | no extension |
| PES_header_data_length | 8 | | 05h | 5 |
| '0001' | 4 | 5 | Provider defined | |
| DTS[32 ... 30] | 3 | | | |
| marker_bit | 1 | | | |
| DTS[29 ... 15] | 15 | | | |
| marker_bit | 1 | | | |
| DTS[14 ... 0] | 15 | | | |
| marker_bit | 1 | | | |
| stuffing byte | 0 | 0 | | |
| Private data area | | | | |
| sub_stream_id | 8 | 1 | | |
| Stream Data Area | | | | |

FIG. 3 also shows that the Stream Data Area inside a Stream PES Packet includes an application header, an application header extension and a sequence of application packets, each prefixed by an application packet timestamp. The Application Header may include the following items of data:

| Field | Number of bits | Number of bytes | Value | Comment |
|---|---|---|---|---|
| (1) VERSION | 8 | 1 | 01h | |
| (2) APPLICATION_ID | 16 | 2 | | |
| (3) MAX_BITRATE | 32 | 4 | | |
| (4) SMOOTH_BUF_SIZ | 16 | 2 | '3540 bytes' | |
| (5) TS_REF_CL_FREQ | 32 | 4 | '27 MHz' | |
| (6) AP_PKT_LEN | 16 | 2 | | |
| (7) TS_LEN | 8 | 1 | 04h | 4 |
| (8) AP_PKT_Ns | 8 | 1 | | |
| (9) START_OF_STR | 1 | | 0b or 1b | |
| (10) END_OF_STR | 1 | 1 | 0b or 1b | |
| reserved | 6 | | 111111b | |
| reserved | 56 | 7 | 7x(FFh) | |
| Total | | 25 | | |

(1) VERSION describes the version number of the application header format.
(2) APPLICATION_ID describes the application that generated the stream. If the application is unknown, 0x0000 is encoded.
(3) MAX_BITRATE describes the output bitrate parameter of the leaky bucket flow control model in Mbps.
(4) SMOOTH_BUF_SIZ describes the buffer size parameter of the leaky bucket flow control model.
(5) TS_REF_CL_FREQ describes the reference clock frequency of the packet arrival/delivery timestamp.
(6) AP_PKT_LEN describes the length of the application packet, excluding the timestamp, in bytes.
(7) TS_LEN describes the length of the timestamp field in bytes and is set to the value '4'.

(8) AP_PKT_Ns is the number of application packets in this Stream PES Packet DVD pack:
AP_PKT_Ns=1, 2, ..., 487 div AP_PKT_LEN
(9) START_OF_STR: when set to '1', this Stream PES Packet is the first DVD pack in the stream.
(10) END_OF_STR: when set to '1', this Stream PES Packet is the last DVD pack in the stream.

The application header extension includes a list of entries, where there is exactly one entry of 1 byte for each Applicationtransport layer Packet. These bytes are used to store information that may differ from application packet to application packet. The total length of the application header extension is 46 bytes. The first 'AP_PKT_Ns' entries of these carry valid data. Unused list entries may carry undefined values. The total length of 'application header' and 'application header extension' is 71 bytes.

| Field | Number of bits | Number of bytes | Value | Comment |
|---|---|---|---|---|
| (1) AU_START | 1 | 1 | | |
| (2) AU_END | 1 | | | |
| (3) reserved | 4 | | | |
| (4) COPYRIGHT | 2 | | | |

(1) AU_START: when set to '1', indicates that the associated application packet contains a random access entry point into the stream
(2) AU_END: when set to '1', indicates that the associated application packet is the last packet of a random access point.
(4) COPYRIGHT describes the copyright status of the associated application packet.

The application timestamps ATS of each application packet are represented by a 32 bit value. An ATS is divided into a base part and an extension part. The base part represents the 90 kHz unit value, and the extension part represents the less significant value measured in 27 MHz units:

$0 \leq \text{ATS\_exten} < 300$.

Figure 4:
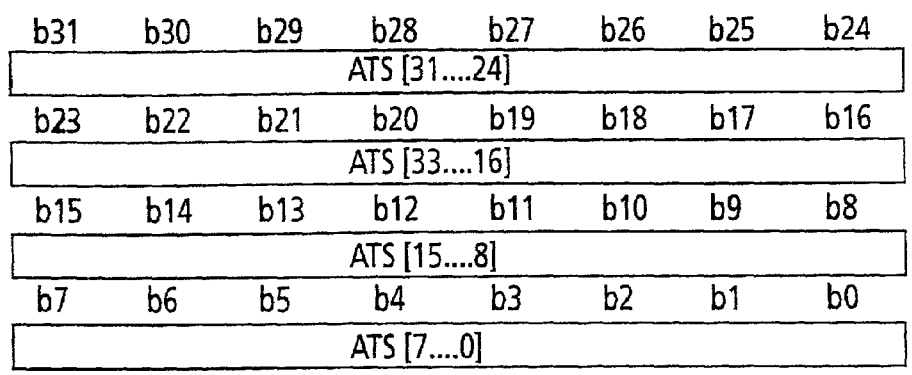
FIG. 4 structure of an application time stamp.

ATS in seconds=ATS_base/90 kHz+ATS_exten/27 MHz Together, ATS_base and ATS_exten cover a range of more than 93 seconds. The application timestamp describing format is depicted in FIG. 4.

The numbers and parameters given in this description are examples and can be adapted correspondingly to other applications of the invention.

What is claimed is:

1. Method for recording or replaying data packets of a bitstream using a stream recorder, wherein timestamps are included in the bitstream data packets to be recorded or to be replayed, said method comprising the steps of:

inputting said bitstream data packets to said stream recorder through a network, which network causes network jitter and which network internally adds network timestamps to data packets of said bitstream in order to reduce by evaluating said network timestamps and said network jitter when outputting said data packets from said network;

recording said timestamps from said network, together with said bitstream data packets to be recorded, in said stream recorder;

replaying said bitstream data packets from said stream recorder, thereby using said recorded network timestamps to assign to the replayed bitstream data packets the correct temporal position as determined during said recording step;

passing the replayed and relocated bitstream data packets pass through said network.

2. Method according to claim 1, wherein said network temporally compresses the input data packets.

3. Method according to claim 2, wherein any scrambling of said input data packets is kept unchanged.

4. Method according to claim 1, wherein said network is an IEEE1394 connection.

5. Method according to claim 4, wherein any scrambling of said input data packets is kept unchanged.

6. Method according to claim 1, wherein any scrambling of said input data packets is kept unchanged.

7. The method according to claim 1, wherein said network is a bi-directional network.

8. The method according to claim 1, wherein said bitstream is a MPEG bitstream.

9. Stream recorder for recording or replaying data packets of an MPEG bitstream, wherein MPEG timestamps are included in the MPEG bitstream data packets to be recorded or to be replayed, including:

a network interface through which said MPEG bitstream data packets are input to said stream recorder for recording, and through which said MPEG bitstream data packets replayed from said stream recorder pass again, which network causes network jitter and which network internally adds network timestamps to data packets of said bitstream in order to reduce by evaluating said network timestamps said network jitter when outputting said data packets from said network;

stream recording means which record timestamps from said network together with said MPEG bitstream data packets, or which replay said MPEG bitstream data packets, wherein when replaying data of said MPEG bitstream data packets said recorded network timestamps are used to assign to the replayed MPEG bitstream data packets the correct temporal position as it was upon recording.

10. Stream recorder according to claim 9, wherein said network temporally compresses the input data packets.

11. Stream recorder according to claim 10, wherein any scrambling of said input data packets is kept unchanged.

12. Stream recorder according to claim 9, wherein said network is an IEEE 1394 connection.

13. Stream recorder according to claim 12, wherein any scrambling of said input data packets is kept unchanged.

14. Stream recorder according to claim 9, wherein any scrambling of said input data packets is kept unchanged.

* * * * *